(12) United States Patent
Whitehead et al.

(10) Patent No.: US 8,249,337 B2
(45) Date of Patent: *Aug. 21, 2012

(54) METHODS AND SYSTEMS FOR CONVERTING IMAGES FROM LOW DYNAMIC RANGE TO HIGH DYNAMIC RANGE

(75) Inventors: Lorne A. Whitehead, Vancouver (CA); Helge Seetzen, Vancouver (CA); Gregory John Ward, Albany, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1165 days.

This patent is subject to a terminal disclaimer.

(21) Appl. No.: 11/831,521

(22) Filed: Jul. 31, 2007

(65) Prior Publication Data
US 2008/0031517 A1    Feb. 7, 2008

Related U.S. Application Data

(63) Continuation of application No. 10/599,955, filed as application No. PCT/CA2004/002198 on Dec. 24, 2004.

(60) Provisional application No. 60/562,240, filed on Apr. 15, 2004.

(51) Int. Cl.
*G06K 9/00* (2006.01)

(52) U.S. Cl. ........ 382/162; 382/163; 382/166; 382/167; 385/570; 385/518; 385/504; 385/538

(58) Field of Classification Search .................. 382/167, 382/166, 103, 165, 162; 708/200, 203, 204, 708/208, 209, 400; 358/520, 518, 504, 538, 358/540, 537, 1.9, 1.1
See application file for complete search history.

(56) References Cited

U.S. PATENT DOCUMENTS

| | | | |
|---|---|---|---|
| 6,038,576 A * | 3/2000 | Ulichney et al. | .............. 708/208 |
| 6,040,791 A | 3/2000 | Kassmann | |
| 6,108,443 A | 8/2000 | Ito | |
| 6,282,311 B1 | 8/2001 | McCarthy | |
| 6,282,312 B1 | 8/2001 | McCarthy | |
| 6,282,313 B1 | 8/2001 | McCarthy | |
| 6,285,784 B1 | 9/2001 | Spaulding | |
| 6,292,168 B1 * | 9/2001 | Venable et al. | ............... 345/605 |

(Continued)

FOREIGN PATENT DOCUMENTS

JP    S60-218181 A    10/1985

(Continued)

OTHER PUBLICATIONS

Spaulding, Kevin et al., "Using a Residual Image to Extend the Color Gamut and Dynamic Range of an sRGB Image", Eastman Kodak Company, 2003, pp. 1-9.

(Continued)

*Primary Examiner* — Matthew Bella
*Assistant Examiner* — Mekonen Bekele

(57) ABSTRACT

Aspects of the invention provide systems and methods for converting a digital image represented in a lower bit depth representation to a higher bit depth representation. A saturation region is identified, where a color model value of the pixels in the saturation region is above an upper saturation threshold or below a lower saturation threshold. The color model value for each pixel in the saturation region is then adjusted by a corresponding adjustment. The magnitude of the adjustment for each pixel is based on characteristics of the image data.

14 Claims, 11 Drawing Sheets

U.S. PATENT DOCUMENTS

| | | | |
|---|---|---|---|
| 6,301,393 B1 | 10/2001 | Spaulding | |
| 6,335,983 B1 | 1/2002 | McCarthy | |
| 6,542,260 B1 | 4/2003 | Gann | |
| 6,625,324 B1 | 9/2003 | Tsai | |
| 6,748,106 B1 | 6/2004 | Bryant | |
| 6,754,384 B1 | 6/2004 | Spaulding | |
| 6,775,407 B1 | 8/2004 | Gindele | |
| 6,795,585 B1 | 9/2004 | Parada | |
| 6,822,760 B1 | 11/2004 | Spaulding | |
| 7,286,702 B2 * | 10/2007 | Oohara | 382/167 |
| 7,468,821 B2 * | 12/2008 | Hashiguchi et al. | 358/520 |
| 2003/0222991 A1 | 12/2003 | Maummar | |
| 2004/0184670 A1 * | 9/2004 | Jarman et al. | 382/274 |
| 2004/0184766 A1 * | 9/2004 | Kim et al. | 386/46 |
| 2004/0240747 A1 * | 12/2004 | Jarman et al. | 382/274 |

FOREIGN PATENT DOCUMENTS

| | | |
|---|---|---|
| JP | H4-311195 A | 11/1992 |
| JP | H11-069187 A | 3/1999 |
| JP | 2004-005694 A | 1/2004 |
| WO | WO 03071781 A1 * | 8/2003 |

OTHER PUBLICATIONS

Spaulding, Kevin et al., "Extending the Color Gamut and Dynamic Range of an sRGB Image Using a Residual Image", Color Research and Application, vol. 28, No. 4, Aug. 2003, pp. 251-266.

* cited by examiner

METHODS AND SYSTEMS FOR CONVERTING IMAGES FROM LOW DYNAMIC RANGE TO HIGH DYNAMIC RANGE

REFERENCE TO RELATED APPLICATION

This is a continuation of U.S. application Ser. No. 10/599,955 filed on 24 Dec. 2004 and claims the benefit of the filing date of U.S. Application No. 60/562,240 filed on 15 Apr. 2004 entitled "Low Dynamic Range Image Enhancement for High Dynamic Range Systems" both of which are hereby incorporated by reference.

TECHNICAL FIELD

The invention pertains to the field of digital imaging systems. Specific embodiments of the invention relate to the conversion of digital images from representations having relatively low dynamic ranges to representations having relatively high dynamic ranges.

BACKGROUND

Digital images typically comprise an array of picture elements or pixels. In color images, each pixel represents the color at a particular point in the image. In black and white (or grayscale) images, each pixel represents the luminance level at a particular point in the image.

There are many models for encoding the color (or the gray level) associated with particular pixels in a digital image. Typically, for color images, such models involve three color model values. For example, in the well known RGB color model, each pixel is represented by a value (R) corresponding to the level of the primary color red, a value (G) corresponding to the level of the primary color green and a value (B) corresponding to the level of the primary color blue. In another common color model, referred to as the YIQ model, each pixel is represented by a value (Y) referred to as the luminance and a pair of values (I, Q) referred to as the chrominance. The YIQ model is used in the NTSC television standard. There are other many other color models which are well known to those skilled in the art. Non-limiting examples of other color models include: CMY and CMYK (used in the printing industry), YUV (used in the PAL video standard), YCbCr (used in the JPEG and MPEG standards), HSV and HSL.

In practice, digital imaging systems encode each color model value for a given pixel using a number of binary bits. The number of bits for each color model value may be referred to as the "bit depth" of that color model value. Many prior art digital imaging systems use 8-bits (i.e. an effective range of 0 to $(2^8-1)=255$) for each color model value. For example, a prior art system using an RGB color model may use an 8-bit number for each of the R, G and B color model values. The maximum number of distinct colors that can be represented in such a system is then $2^8 \times 2^8 \times 2^8 = 2^{24}$. These digital imaging systems may be referred to as low dynamic range (LDR) systems.

Recent developments in digital imaging systems have provided digital imaging systems with the capability to display images having more than $2^{24}$ distinct colors. Such digital imaging systems may be referred to as high dynamic range (HDR) systems. Some HDR imaging systems are capable of processing and/or displaying color model values with a greater bit depth (i.e. more than 8 bits are used for each color model value).

Some color models, such as the YIQ model described above, are designed to take advantage of the perception characteristics of the human eye. It has been discovered that the human eye is more perceptive to differences in luminance (Y) than to differences in chrominance (I, Q). Accordingly, some digital imaging systems may be designed to have a higher bit depth in the color model value associated with luminance (Y) and a lower bit depth in the color model values associated with chrominance (I, Q).

There is a general desire for newer generation HDR systems to be backwards compatible. Accordingly, there is a general need to provide higher bit depth imaging systems with the ability to convert and use images captured by lower dynamic range systems or images otherwise represented with a lower bit depth.

When one or more of the color model values for a pixel in a digital image is at its maximum possible value, the color model value is said to be "saturated". For example, in a 8-bit LDR imaging system using a YIQ color model, the luminance value (Y) is saturated when it has a value of $2^8-1=255$. Luminance saturation can occur when capturing a digital image having a very bright spot, such as a light or the sun, for example. Those skilled in the art will appreciate that saturation of any of the color model values in a digital image may involve a loss of image information. In some applications, there is a desire to reconstruct or otherwise estimate some of the image information lost when one or more of the color model values in a digital image is saturated.

SUMMARY OF THE INVENTION

One aspect of the invention provides a method for converting image data from a lower bit depth representation to a higher bit depth representation. The method involves identifying pixels in a saturation region. A color model value of each individual pixel in the saturation region is above an upper saturation threshold and/or below a lower saturation threshold. The method also involves adjusting the color model value of each of the individual pixels in the saturation region by a corresponding adjustment, a magnitude of each adjustment dependent, at least in part, on a number of pixels between the corresponding pixel and an edge of the saturation region.

Another aspect of the invention provides a computer program product comprising a medium carrying computer readable instructions which, when executed by a processor, cause the processor to execute a method for converting image data from a lower bit depth representation to a higher bit depth representation. The method involves identifying pixels in a saturation region. A color model value of each individual pixel in the saturation region is above an upper saturation threshold and/or below a lower saturation threshold. The method also involves adjusting the color model value of each of the individual pixels in the saturation region by a corresponding adjustment, a magnitude of each adjustment dependent, at least in part, on a number of pixels between the corresponding pixel and an edge of the saturation region.

Yet another aspect of the invention provides a system for processing image data, the system comprising a processor for converting image data from a lower bit depth representation to a higher bit depth representation. The processor is configured to identify pixels in a saturation region. A color model value of each individual pixel in the saturation region is above an upper saturation threshold and/or below a lower saturation threshold. The processor is also configured to adjust the color model value of each of the individual pixels in the saturation region by a corresponding adjustment, a magnitude of each adjustment dependent, at least in part, on a number of pixels between the corresponding pixel and an edge of the saturation region.

Further features and applications of specific embodiments of the invention are described below.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Aspects of the invention provide systems and methods for converting a digital image represented in a lower bit depth to a representation having a higher bit depth. Saturation region(s) are identified within the image data. The pixels in a saturation region have a color model value that is above an upper saturation threshold or below a lower saturation threshold. The color model value for each pixel in the saturation region is then adjusted according to one or more characteristics of the image data. For example, the color model value for each pixel in the saturation region may be scaled by a corresponding scaling factor. The amount of adjustment (e.g. the amplitude of the scaling factor) corresponding to a particular pixel may depend on one or more of:

- a distance of the particular pixel from an edge of the saturation region;
- a size of the saturation region;
- a gradient of the color value in the pixels just outside the saturation region;
- a temporal behavior of the color value of the particular pixel;
- a behavior of the other color values corresponding to the particular pixel; and
- a presence of a lens flare pattern surrounding the saturation region.

The adjusted color model values form a higher bit depth representation of the image which may be used for subsequent processing and/or display.

Figure 1A:
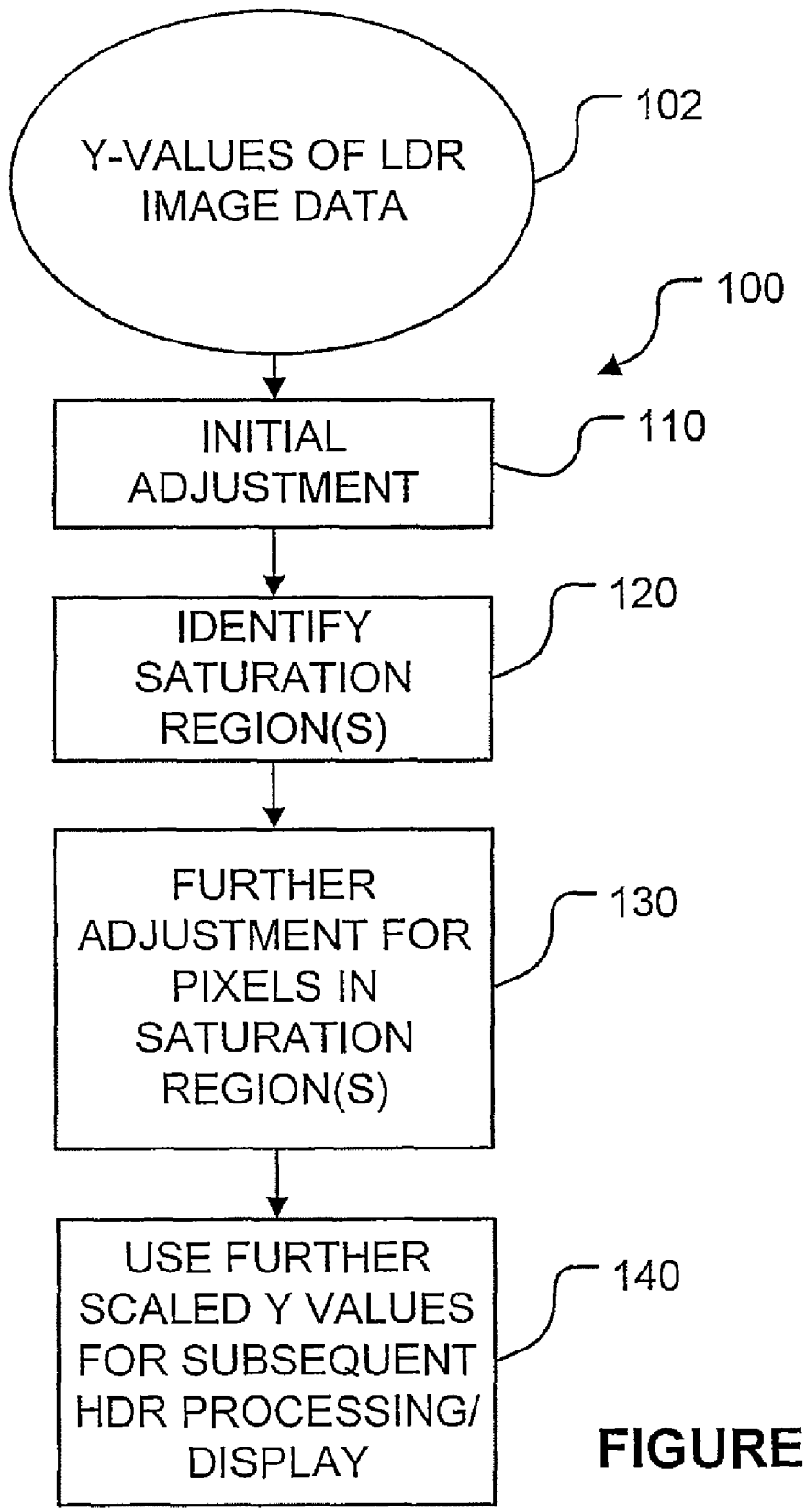
FIG. 1A is a schematic diagram of a method for converting the color model values of an image from a lower bit depth representation to a higher dynamic range according to one embodiment of the invention.

FIG. 1A is a schematic diagram of a method 100 for converting a color model value of an image represented in a lower bit depth to a higher bit depth according to a particular embodiment of the invention. For ease of explanation, it is assumed that: (i) the image being subjected to method 100 is encoded in the YIQ color model; (ii) the color model value being subjected to method 100 is luminance (Y); and (iii) the Y-value in the lower dynamic range representation of the image has the standard 8-bit LDR depth, while the Y-value in the higher dynamic range representation has a 16-bit HDR depth. Those skilled in the art will appreciate that method 100 may be applied to image data encoded using other color models and to different color model values within such color models. Method 100 may also be applied to combinations of color model values (e.g. linear or non-linear combinations of color model values) rather than to individual color model values. In some embodiments, a combination of color model values is used to determine suitable adjustments and then the adjustments are applied to individual color model values. Method 100 may also be used to convert any lower bit depth representation to a higher bit depth representation regardless of the difference in bit depth.

Method 100 commences in block 110 where the Y-value 102 for each pixel of the LDR image data is initially adjusted to fit in a higher bit depth representation. In one particular embodiment, the block 110 initial adjustment is uniform (i.e. constant) for the Y-value of each pixel. In other embodiments, the block 110 initial adjustment may comprise a gamma correction or some other non-uniform adjustment, such as a linear or non-linear adjustment. The block 110 initial adjustment may involve the use of a look-up table. After initial adjustment in block 110, method 100 proceeds to block 120 which involves identifying saturation region(s) in the image data. Identifying saturation region(s) may involve identifying pixels having Y-values above an upper saturation threshold or below a lower saturation threshold.

In block 130, the Y-values of the pixels in the saturation region(s) are further adjusted according to one or more image characteristics. The adjustment of the Y-values of pixels in a saturation region may be non-uniform. That is, the Y-values of individual pixels in a saturation region may be adjusted by different amounts. Preferably, the further adjustment of the Y-values of individual pixels in saturation region(s) is deter mined according to one or more characteristics of the image data. Examples of suitable image data characteristics include:
- a distance of the particular pixel from an edge of the saturation region;
- a size of the saturation region;
- a gradient of the color value in the pixels just outside the saturation region;
- a temporal behavior of the color value of the particular pixel;
- a behavior of the other color values corresponding to the particular pixel; and
- a presence of a lens flare pattern surrounding the saturation region.

After further adjusting the Y-values of the pixels in the saturation region(s), method 100 proceeds to block 140, where the adjusted Y-values (i.e. the output of block 130) may optionally be used for further HDR processing/display/printing etc. Method 100 is easily implemented and may significantly improve the appearance of HDR images which are converted from LDR image data. In particular, method 100 may improve the appearance of HDR images which are converted from LDR image data when compared to simple linear scaling techniques.

Figure 1B:
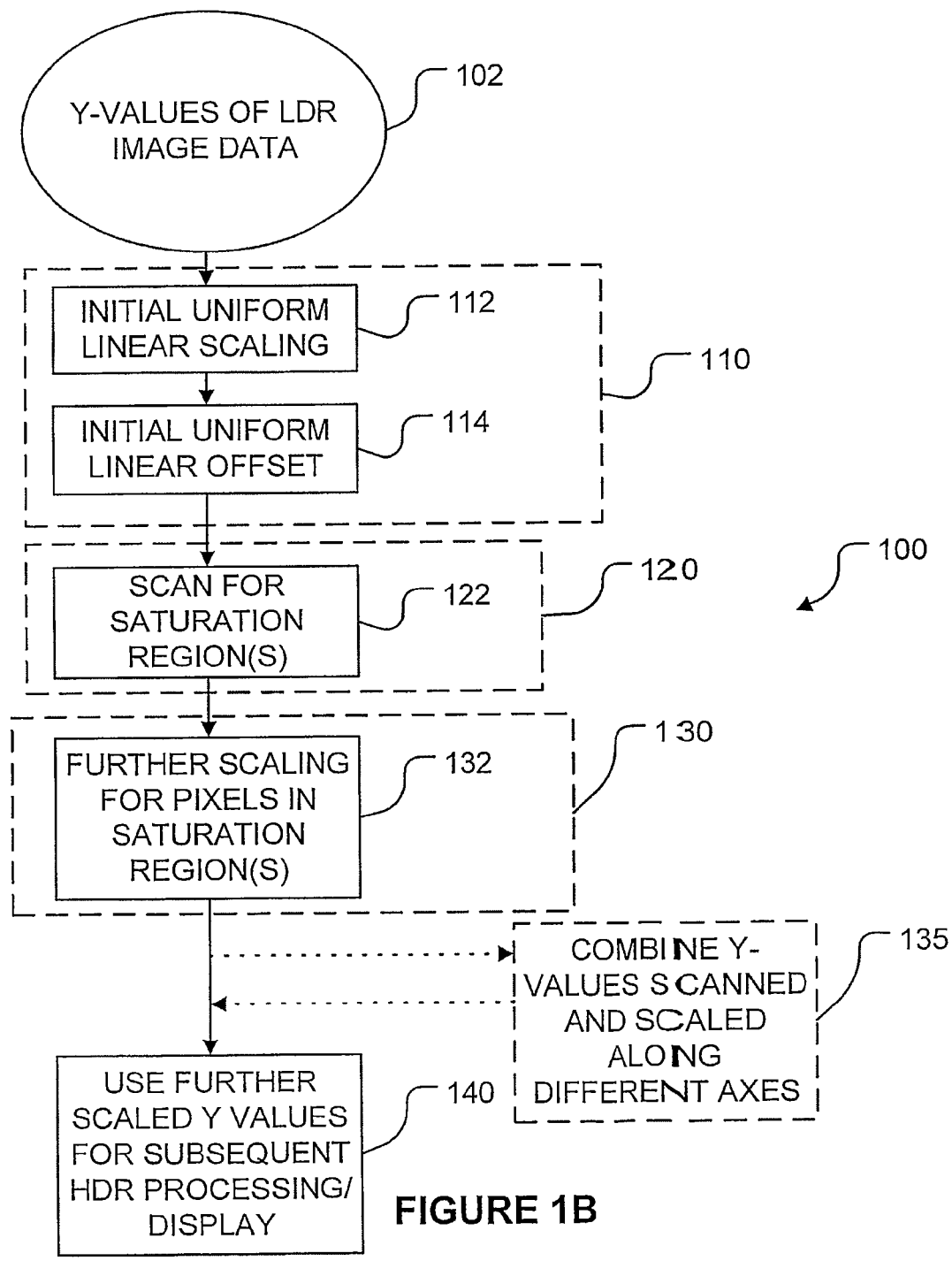
FIG. 1B is an example of a particular embodiment of the method of FIG. 1A.

Method 100' of FIG. 1B is an example of a particular embodiment of method 100 of FIG. 1A. For the purposes of explanation, the description of method 100' involves the assumptions that: (i) the image being subjected to method 100' is encoded in the YIQ color model; (ii) the color model value being subjected to method 100' is luminance (Y); and (iii) the Y-value in the lower dynamic range representation of the image has the standard 8-bit LDR depth, while the Y-value in the higher dynamic range representation has a 16-bit HDR depth. Those skilled in the art will appreciate that method 100' may be applied to image data encoded using other color models and to different color model values within such color models. Method 100' may also be applied to combinations of color model values (e.g. linear or non-linear combinations of color model values) rather than to individual color model values. In some embodiments, a combination of color model values is used to determine suitable adjustments and then the adjustments are applied to individual color model values. Method 100' may also be used to convert any lower bit depth representation to a higher bit depth representation regardless of the difference in bit depth.

Method 100' commences with initial adjustment (block 110) of the Y-values of the pixels in image data 102. In the particular embodiment of method 100', the block 110 initial adjustment is divided into uniform scaling (block 112) and uniform offset (block 114). As discussed above, in alternative embodiments, the block 110 initial adjustment may comprise a gamma correction or some other non-uniform adjustment, such as a linear or non-linear adjustment. The block 110 initial adjustment may involve the use of a look-up table.

The block 112 scaling involves a constant scaling factor for the Y-value of each pixel in the image data. Uniform scaling of the Y-values 102 may be regarded as a first order conversion between the 8-bit LDR depth and the 16-bit HDR depth. For example, a 8-bit LDR Y-value has a range of $2^8$ possible values. If the 8-bit value was scaled by 256 ($2^8$), the range of possible values would increase to $2^{16}$ thereby using the full range of a 16-bit representation. In accordance with method 100', however, the linear scaling performed in block 112 uses a uniform scaling factor which provides less than the full possible range of 16-bit HDR values.

Figure 2A:
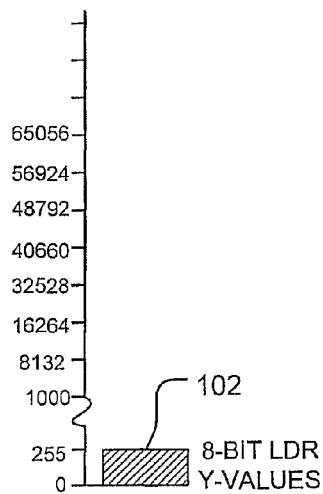
FIG. 2A is a schematic representation of a range of 8-bit color model values prior to processing according to the method of FIG. 1B.
Figure 2B:
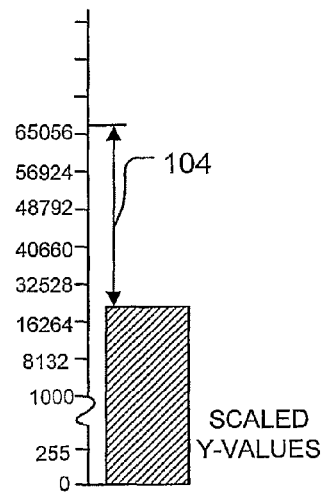
FIG. 2B is a schematic representation of the range of color model values after uniform scaling according to the method of FIG. 1B.

FIGS. 2A and 2B respectively depict schematic representations of the range of values of the Y-values before and after block 112 scaling. In the illustrated example of FIGS. 2A and 2B, the block 112 scaling involves a uniform scaling factor of 100. As shown in FIG. 2B, choosing a scaling factor for block 112 which provides less than the full possible range of HDR values leaves room 104 for further adjustment at the upper end of the Y-value data as discussed in more detail below. In other applications, the uniform scaling factor applied in block 112 may have other values which may depend on the bit depth of the lower bit depth color model values and/or the bit depth of higher bit depth color model values. In some embodiments, the block 112 scaling factor is selected to be in a range of 0.25 to 0.75 of the ratio of the higher bit depth range to the lower bit depth range. In the example conversion from an 8-bit LDR representation to a 16-bit HDR representation, the range of block 112 scaling factors may be $0.25*(2^{16}/2^8)=64$ to $0.75*(2^6/2^8)=192$.

Figure 2C:
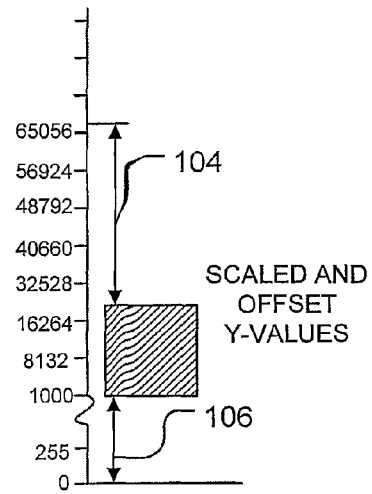
FIG. 2C is a schematic representation of the range of color model values after applying a uniform offset according to the method of FIG. 1B.

Method 100', then proceeds to optional block 114, where the scaled Y-value data output from block 112 is offset by a uniform positive offset. The block 114 offset involves a constant offset for each pixel in the image data. The effect of the block 114 offset is shown schematically in FIGS. 2B (scaled Y-values before offset) and 2C (scaled and offset Y-values). As seen by comparing FIGS. 2B and 2C, adding a uniform positive offset to each of the scaled Y-values has the effect of "sliding" the Y-value range of the entire image upward in level and away from a zero value. In the example of FIGS. 2B and 2C, the block 114 offset involve a positive offset of 1000. As shown in FIG. 2C, a block 114 offset of 1000 will put the Y-value data in a range of 1000-26500 range. In other applications, the constant offset level applied in block 114 may have may have other values which may depend on the bit depth of the lower bit depth color model values and/or the bit depth of higher bit depth color model values. In some embodiments, the block 114 offset is selected to be in a range of 0.01 to 0.1 of the higher bit depth range. For example, where the higher bit depth is 16-bits, the block 114 offset may be selected to be in a range of $0.01*2^{16}=655$ to $0.1*2^{16}=6554$.

As is explained in more detail below, the optional block 114 offsetting shifts the Y-value data away from zero, which allows room 106 for further adjustment at the lower end of the Y-value data. In some applications, it is not necessary or desirable to provide further fractional adjustment at the lower end of the Y-value data. In such applications, the block 114 offset is not required.

As with method 100, block 120 of method 100' involves identification of saturation regions. In the particular embodiment of method 100', the block 120 identification of saturation regions involves scanning Y-values of the image data in block 122 to look for region(s) where the Y-values are saturated. The actual image data scanned in block 122 may be the Y-value data output from block 110 (or one of blocks 112 or 114) or it may be the Y-value data of the original LDR image 102.

In practice, the block 122 scanning process may involve scanning pixels of the image data for region(s) where the Y-values of the pixels are above an upper saturation threshold ($S_{th}$). This upper saturation threshold $S_{th}$ need not necessarily mean that the Y-values are saturated in the strict sense. For example, if the Y-values scanned in block 122 have a bit depth of 8-bits, the upper saturation threshold $S_{th}$ may correspond to a Y-value level of 250. In other applications, the upper saturation threshold $S_{th}$ may be the true saturation threshold (i.e. a Y-value level of 255 for a bit depth of 8-bits). In this description and in the accompanying claims, unless specified otherwise, a saturation region should be understood to mean a region where the color model value in question is greater than an upper saturation threshold and should not be limited to saturation in the strict sense.

Figure 4A:
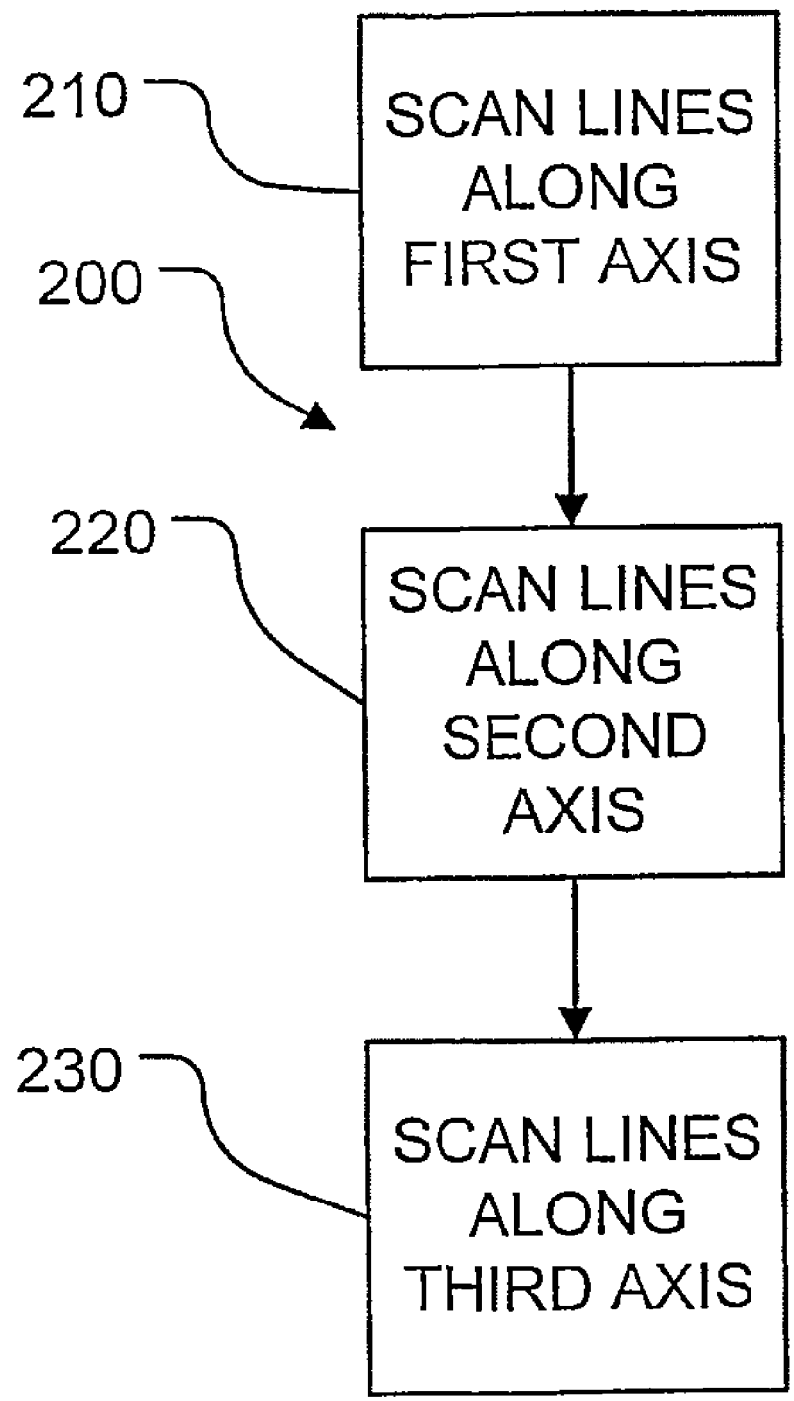
FIG. 4A is a schematic diagram depicting an example of a particular method for scanning the color model values of the image data in the method of FIG. 1B according to a particular embodiment of the invention.

FIG. 4A depicts one example method 200 for scanning the Y-values of the image data in block 122. Scanning method 200 involves scanning the Y-values of the image data along a first axis (block 210), a second axis (block 220) and a third axis (block 230). Scanning the image data along a particular axis may comprise scanning the image data along a series of lines parallel to that axis until the entire image is scanned. In one particular embodiment, the first and second scanning axes (blocks 210, 220) are horizontal and vertical axes and the third scanning axis (block 230) is diagonal. In some embodiments, scanning along the second and/or third axes (blocks 220, 230) is not required. In other embodiments, the Y-values of the image data are scanned along additional axes (not shown), which may include a fourth diagonal axis, oriented opposite to the diagonal axis of block 230.

Figure 3A:
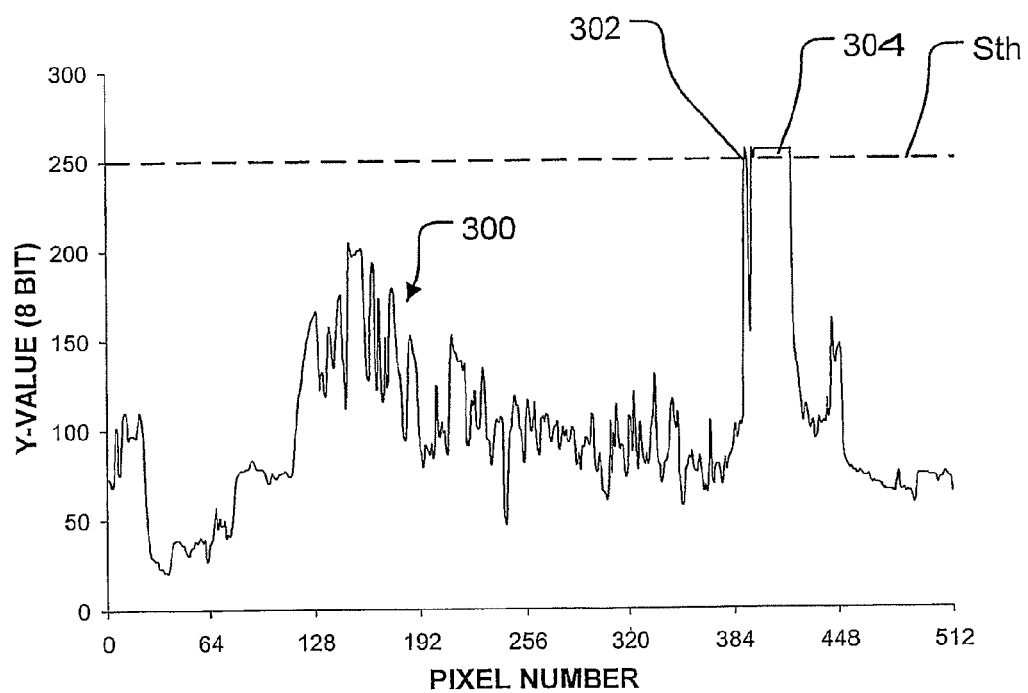
FIG. 3A is a graph which shows an example of the Y-values of pixels on a scan line which may form a part of the method of FIG. 1B.

FIG. 3A is a graph which shows an example of the Y-values on a scan line 300 which may form a part of the scan in blocks 210, 220 or 230. Those skilled in the art will appreciate that scanning an entire image (as is done in blocks 210, 220 and 230) involves a plurality of scan lines similar to scan line 300. For ease of explanation, it is assumed that scan line 300 is a horizontal scan line across an image having a horizontal dimension of 512 pixels. As shown on the vertical axis of the FIG. 3A graph, the example scan line 300 represents a scan performed on the 8-bit Y-value data of the original LDR image 102.

Referring back to FIG. 1B, the purpose of scanning the image data in block 122 is to identify saturation region(s) in the image data, where the Y-values are above an upper saturation threshold $S_{th}$. Assuming (as shown in FIG. 3A) that there is an upper saturation threshold $S_{th}$ at a Y-value level of 250, it can be seen from FIG. 3A, that scan line 300 comprises two saturation regions 302, 304. Saturation region 302 is a relatively small saturation region between pixel numbers 392-395 and saturation region 304 is a relatively large saturation region between pixel numbers 398-419.

Figure 3B:
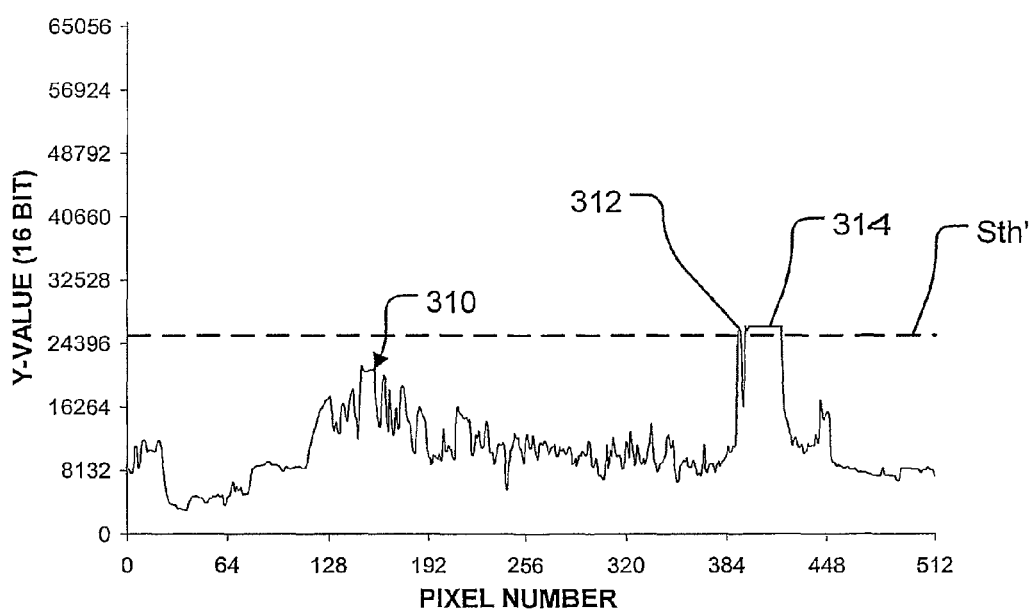
FIG. 3B is a graph which shows an alternative example of the Y-values of pixels on a scan line which may form part of the method of FIG. 1B.
Figure 3C:
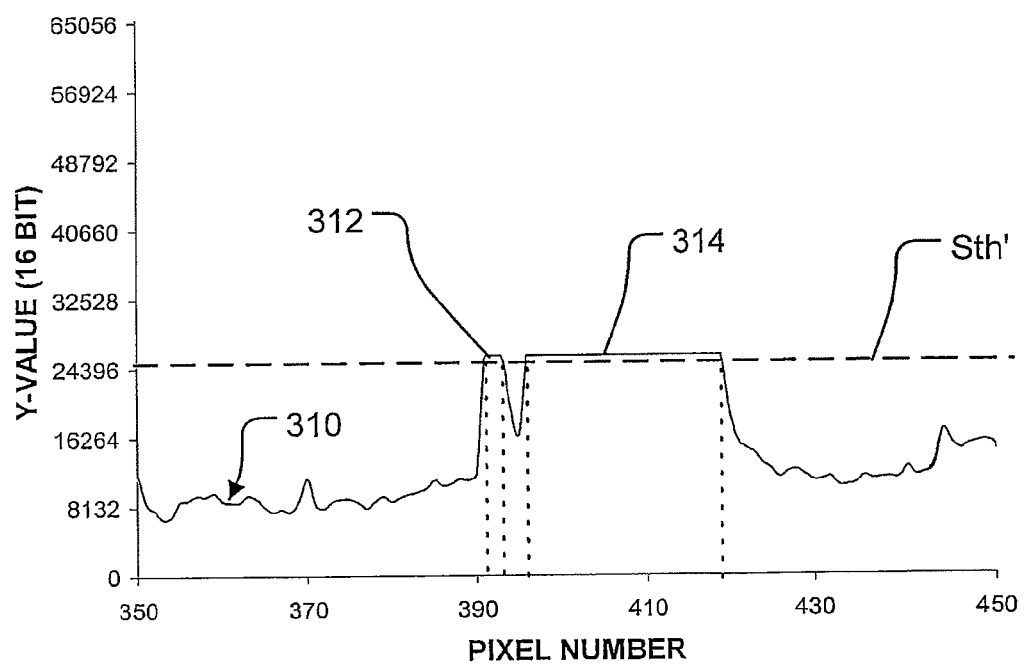
FIG. 3C is a graph which shows the Y-values on a magnified portion of the FIG. 3B scan line.

As discussed above, the block 122 scanning process can also be performed on the Y-values of the image data which have been scaled and/or offset as a part of blocks 112, 114. FIG. 3B is a graph showing a scan line 310 which corresponds to scan line 300 (FIG. 3A), except that scan line 310 is performed on the Y-values of the image data that have been scaled (in block 112) by a factor of 100 and offset (in block 114) by an offset of 1000. FIG. 3C is a magnified view of scan line 310 (FIG. 3B) in the region between pixel numbers 350 and 450. If the upper saturation threshold $S_{th}$ in the example of FIG. 3A is also scaled and offset, then the corresponding upper saturation threshold ($S_{th}'$) for the example of FIGS. 3B, 3C would be $S_{th}'=100 S_{th}+1000=26,000$. It can be seen from FIGS. 3B, 3C that scan line 310 also comprises two saturation regions 312, 314 between pixel numbers 392-395 and pixel numbers 398-419 respectively.

When it is determined in block 120 that the Y-values of the image data include one or more saturation regions, then the Y-values of the pixels in the saturation regions are further adjusted in block 130. In the particular example embodiment of FIG. 1B, the block 130 further adjustment comprises further scaling the Y-values of the pixels in the saturation region(s) in block 132. Those skilled in the art will appreciate that adjustment techniques other than scaling may be used in some embodiments. The block 132 scaling of the Y-values of the pixels in the saturation region(s) attempts to reconstruct some of the image information in the saturation region(s) and to thereby enhance the appearance of the overall HDR image. Considering the example scan line 310 of FIGS. 3B, 3C and the range of the scanned and scaled Y-values shown in FIG. 2C, it is clear that the block 112 scaling and the block 114 offset have left room 104 for further upward scaling of the Y-values in saturation regions 312, 314.

Preferably, the block 132 scaling is determined on a pixel by pixel basis for the pixels within a particular saturation region and involves a prediction as to how the Y-values of the individual pixels might vary within the saturation region. For a particular pixel within the saturation region, this prediction (and the corresponding scaling factor) may be based one or more characteristics of the image data within and/or adjacent to the saturation region. For a particular pixel in a saturation region, such characteristics of the image data within and/or adjacent to the saturation region may include:

- a distance of the particular pixel from an edge of the saturation region;
- a size of the saturation region;
- a gradient of the Y-value in the pixels just outside the saturation region;
- a temporal behavior of the Y-value of the particular pixel;
- a behavior of the other color values corresponding to the particular pixel; and
- a presence of a lens flare pattern surrounding the saturation region.

Figure 4B:
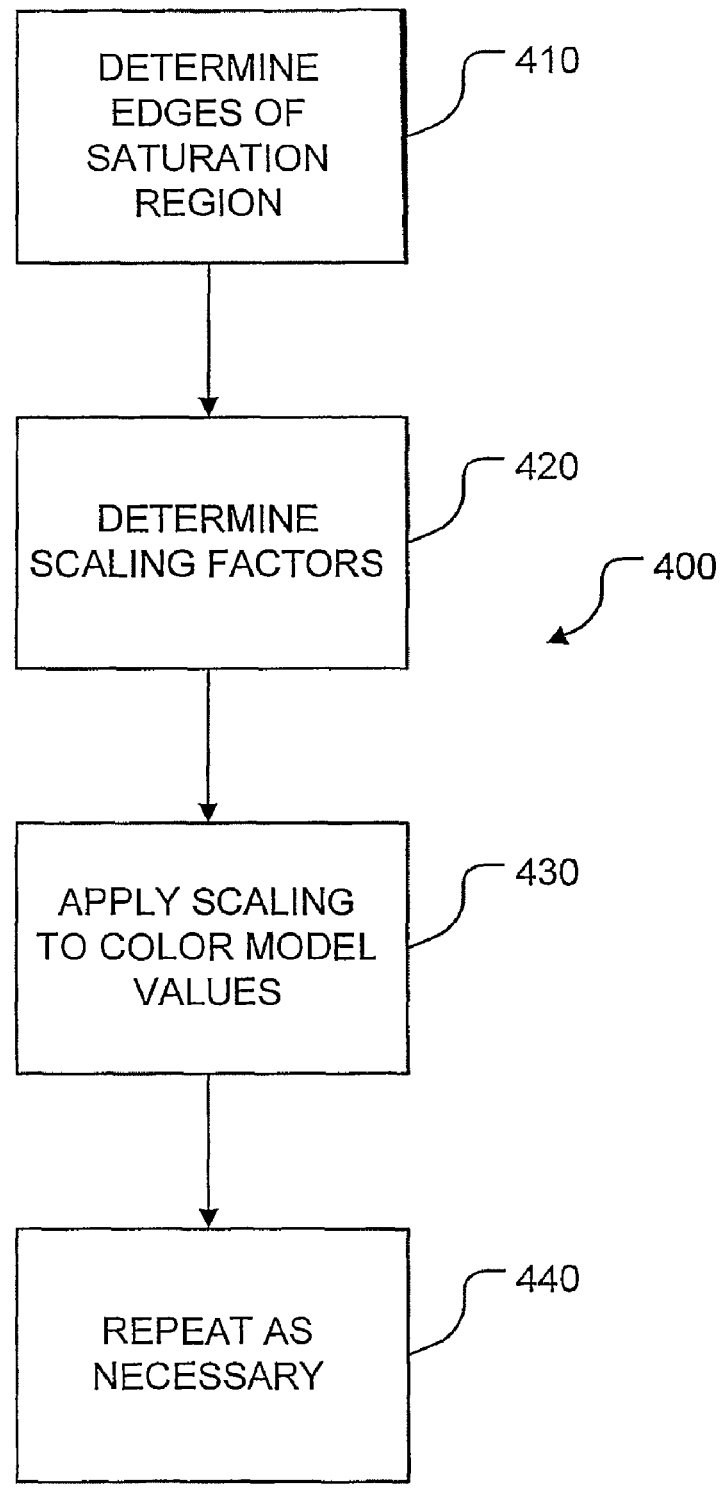
FIG. 4B is a schematic diagram depicting an example of a particular method for scaling the color model values of the image data in the method of FIG. 1B according to a particular embodiment of the invention.

FIG. 4B schematically depicts one example method 400 for scaling the Y-values of the individual pixels within a saturation region in block 132. Scaling method 400 commences in block 410, which involves determining the edges of a saturation region in a particular scan line. For example, in scan line 310 of FIG. 3C, block 410 may involve determining that saturation region 312 begins at pixel number 392 and ends at pixel number 395 and/or that saturation region 314 begins at pixel number 398 and ends at pixel number 419. The difference between the edge pixels of a saturation region yields the size of the saturation region. For example, in scan line 310 of FIG. 3C, saturation region 312 has a dimension of 3 pixels and saturation region 314 has a dimension of 21 pixels. The edges of a saturation region can also be used to determine the center of the saturation region. For example, in scan line 310 of FIG. 3C, saturation region 312 is centered on pixel 394 and saturation region 314 is centered on pixel 409.

Block 420 involves determining scaling factors for the Y-values of each of the individual pixels in the saturation region. Each scaling factor is associated with a particular pixel and the scaling factor for each pixel may be different. In one embodiment of the invention, the scaling factor for the Y-value associated with each pixel is determined on the basis of a distance of the particular pixel from an edge of the saturation region. The scaling factors may be smaller for pixels that are relatively close to an edge of the saturation regions and larger for pixels that are relatively far from an edge of the saturation region. An additional or alternative basis for determining the scaling factor for the Y value associated with each pixel may be the size of the saturation region.

In one particular embodiment, the block 420 determination of the scaling factor for a particular pixel within a saturation region is based on a parabolic equation where the extremum (i.e. vertex) of the parabola is located at the center of the saturation region. The height of the parabola may be positively correlated to the size of the saturation region. An example of a parabolic equation for calculating these scaling factors is:

$$L(x) = \frac{1}{4} \frac{x^2 - 2vx + v^2 + 4L_v k}{k} \qquad (1)$$

where: x is an index of the pixel number in a saturation region and it is assumed that x=0 is the first saturated pixel; v is the index of the center pixel in the saturation region (i.e. the vertex pixel); $L_v$ is the maximum scaling factor (i.e. the scaling factor at the vertex of the parabola); and k is a steepness parameter.

Assuming that it is desirable to match the edges of the saturation region with the surrounding image, the scaling factors may be selected to be unity at the beginning and end pixels of the saturation region. With such a boundary condition, there are two remaining parameters to be chosen in parabolic equation (1), namely: the maximum scaling factor $L_v$ and the steepness parameter k.

In one embodiment, the maximum scaling factor $L_v$ may be set at a predetermined level. Such a predetermined maximum scaling level $L_v$ may depend on the amount of initial scaling performed in block 112 (FIG. 1B) and the bit depths of the original lower bit depth image data and the resultant higher bit depth image data.

In another embodiment, selection of the maximum scaling factor $L_v$ is based, at least in part, on the size of the saturation region. Preferably, the maximum scaling factor $L_v$ is positively correlated with the size of the saturation region. That is, the maximum scaling factor $L_v$ is selected to be larger for larger saturation regions and smaller for smaller saturation regions. In one example, the maximum scaling factor $L_v$ is chosen to be directly proportional to the size of the saturation region up to a maximum value.

If $L_v$ is selected to have a particular value and the scaling factors are selected to be unity at the beginning and end pixels of the saturation region, then the steepness parameter k is given by:

$$k = \frac{1}{4} \frac{v^2}{1-L_v} \quad (2)$$

Figure 5:
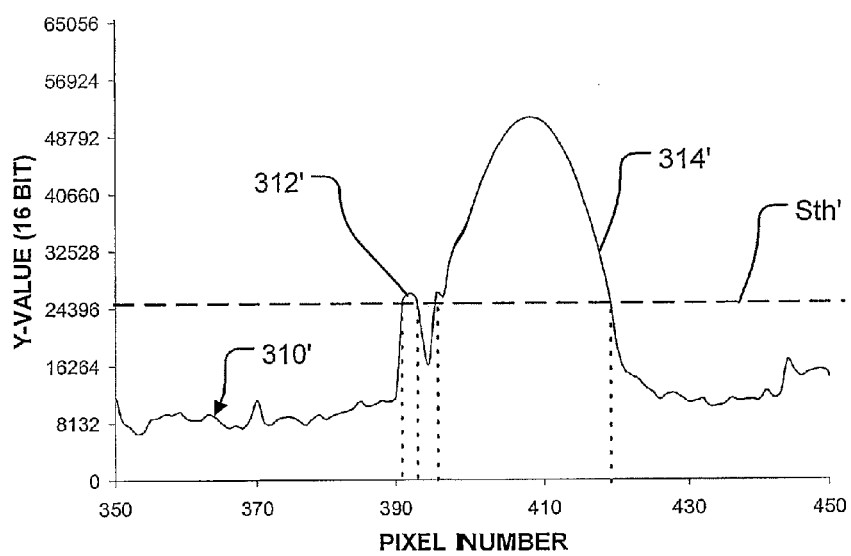
FIG. 5 is a graph which shows the Y-values of the FIG. 3C scan line portion after scaling in accordance with a particular scaling method.

The scaling factors determined in block 420 are used to scale the Y-values for each of the pixels in the saturation in block 430. FIG. 5 depicts a portion of a scan line 310' after the block 420 scaling in accordance with equation (1). The scaling of scan line 310' can be seen by comparing regions 312', 314' of scaled scan line 310' (FIG. 5) to regions 312, 314 of the non-scaled scan line 310 (FIG. 3C). FIG. 5 shows that the scaling in legions 312', 314' is parabolic in shape.

FIG. 5 also shows that the amplitude of the parabolic scaling in region 314' is greater than the amplitude of the parabolic scaling in region 312'. That is, in the graph of FIG. 5, the maximum scaling factor $L_v$ of region 314' is selected to be greater than the maximum scaling factor $L_v$ of region 312', because saturation region 314 (FIG. 3C) is larger than saturation region 312 (FIG. 3C). This demonstrates the positive correlation between the selection of the maximum scaling factor $L_v$ and the size of the saturation region in accordance with a particular embodiment of the invention. Those skilled in the art will appreciate that if the maximum scaling factor $L_v$ were set at the same predetermined level for saturation regions 312 and 314, then the parabolic regions 312' and 314' of FIG. 5 would have a substantially similar height.

Preferably, the selection of the maximum scaling factor $L_v$ is made conservatively. If the maximum scaling factor $L_v$ is chosen to be too large, then the block 132 scaling may introduce artefacts. In the case of scaling Y-values (luminance), selection of a maximum scaling factor $L_v$ that is too high may cause saturation regions to be scaled in a manner which makes them too bright. When selection of the maximum scaling factor $L_v$ is correlated with the size of the saturation region and selection of the maximum scaling factor is made conservatively $L_v$, some small areas that are supposed to be very bright may be underscaled. Fortunately, the human vision system is incapable of assessing the brightness of small areas very accurately.

The scaling factors for the Y-values of each of the individual pixels in the saturation region may be determined using other techniques which depend on the distance of the individual pixel from the edge of the saturation region. For example, a linear equation or a higher order equation may be used to determine the scaling factors. An example of a suitable linear equation is given by:

$$L(x) = \begin{cases} \frac{L_v - 1}{v}x + 1 & \text{for } 0 \le x \le L_v \\ \frac{1 - L_v}{v}x + 2L_v - 1 & \text{for } v < x \le 2v \end{cases} \quad (3)$$

where: x is an index of the pixel number in a saturation region and it is assumed that x=0 is the first saturated pixel; v is the index of the center pixel in the saturation region; and $L_v$ is a maximum scaling factor. The maximum scaling factor $L_v$ may be determined by any of the techniques disclosed herein.

Scaling method 400 may be repeated in block 440 for each saturation region along a particular scan line to complete the scaling of a scan line. All of the scan lines of an image along a particular axis may be scaled in a similar manner. At the completion of this process, the Y-values of the image data scanned along a particular axis (for example, the Y-values of the image data scanned in block 210 (FIG. 4A)) will be completely scaled. Similar scaling processes can be used to scale the Y-values of the image data scanned along the other axes, for example the Y-values of the image data scanned in blocks 220, 230 (FIG. 4A).

Figure 6A:
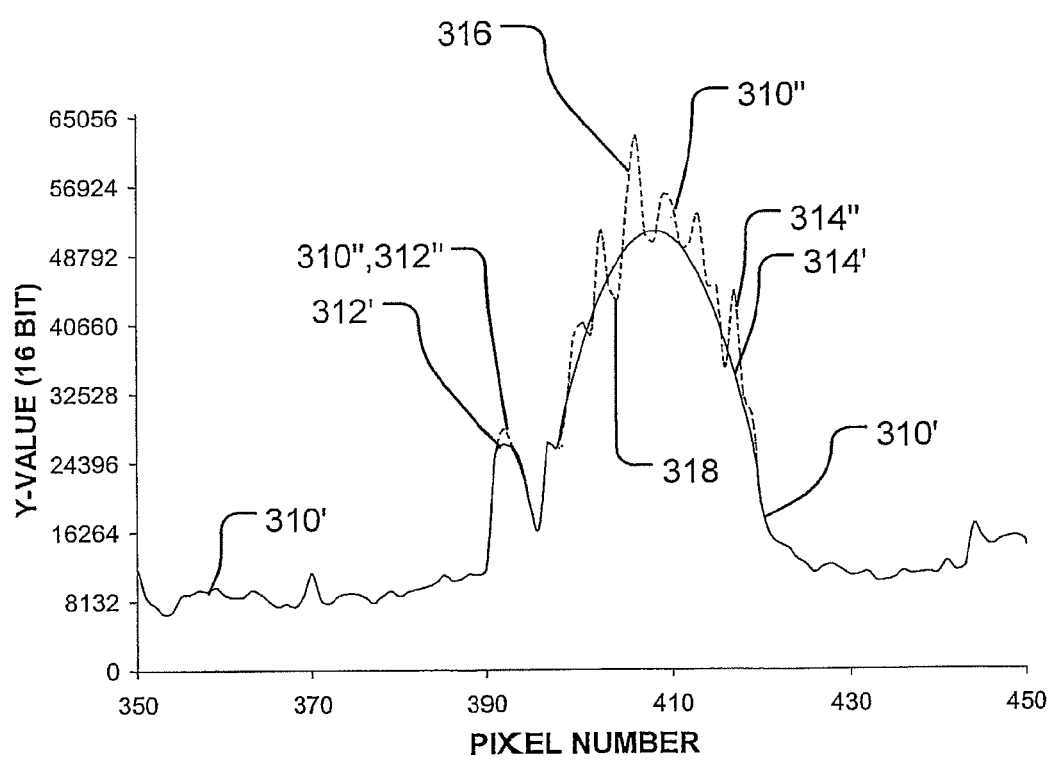
FIG. 6A is a graph which shows the Y-values of the scaled scan line portion of FIG. 5 together with Y-values of the same pixels which have been scanned and scaled along a different axis.

In one particular embodiment, the scaled Y-values of the image data scanned and scaled along a first axis can be combined with the Y-values of the image data scanned and scaled along one or more other axes. Such a combination of Y-values scanned and scaled along different axes may take place in an optional block 135 (FIG. 1B). FIG. 6A depicts the Y-values of scan line 310' of FIG. 5 which have been scanned and scaled along a first axis, for example a horizontal axis. FIG. 6A also depicts (in dashed lines) the scaled Y-values 310" of pixels that have been scaled and scanned using the same process, but on a second axis, for example a vertical axis. It can be seen from FIG. 6A that Y-values 310" which have been scanned and scanned along a second axis have been scaled in the same saturation regions 312", 314", but that the scaling is different.

In some regions 316, the scaled Y-values 310" are larger than the scaled Y-values 310' and in other regions 318, the scaled Y-values 310" are smaller than the scaled Y-values 310'. These scaling differences may occur because of the selection of the maximum scaling factor $L_v$. As discussed above, selection of the maximum scaling factor $L_v$ may be based on the size of the saturation region. Accordingly, the different scaling of the Y-values in regions 316, 318 may be due to different dimensions of the saturation region when it is scanned along the first and second axes. The scaling differences in regions 316, 318 may also be due to the different locations of the individual pixels relative to the edges of the saturation region when it is scanned along the first and second axes.

Figure 6B:
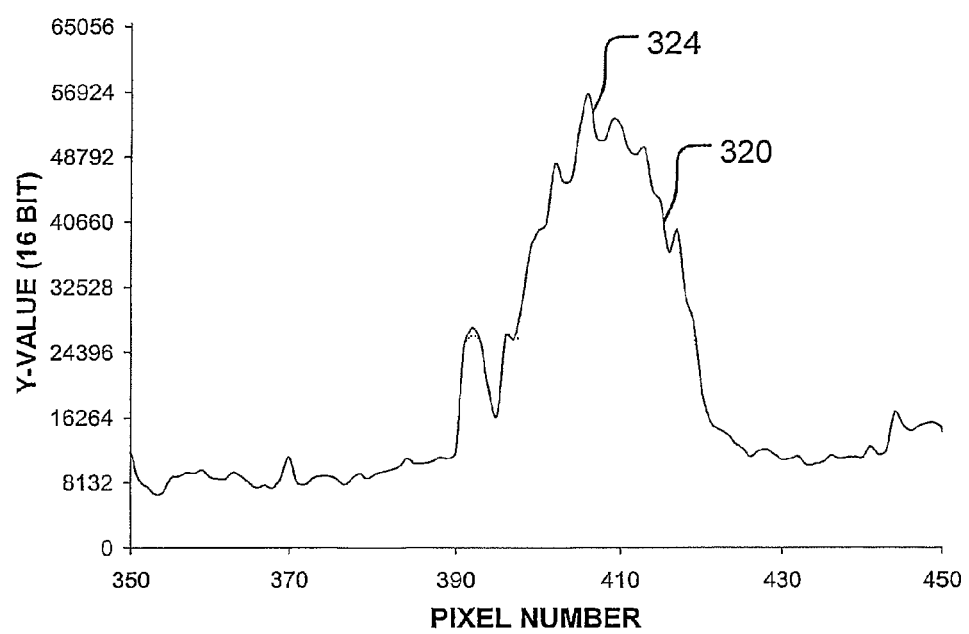
FIG. 6B is a graph which shows an average of the Y-values for the pixels shown in the graph of FIG. 6A.

One method of combining the Y-values of the image data scanned and scaled along a plurality of axes (block 135) is averaging. FIG. 6B depicts the Y-values 320 of a line of image data after averaging the Y-values 310' and 310". While Y-values 320 of FIG. 6B represent an average of the Y-values 310', 310" of the image data scanned and scaled along two axes, those skilled in the art will appreciate that the Y-values of image data scanned and scaled along other axes may also be averaged in a similar manner.

Y-values 320 of FIG. 6B represent a conventional averaging technique. In some applications, it may be useful to combine the Y-values of image data scanned and scaled along various axes (block 135) in a different manner, such as by weighted averaging or according to some other function, for example. In one particular alternative embodiment, the Y-values of image data are scanned and scaled along a first axis and then the result of the first scanning and scaling operation is subsequently scanned and scaled along a different axis. In another alternative embodiment, the Y-values of image data scanned and scaled along different axes are combined in a "blurry averaging" technique which may comprise conventional averaging, followed by blurring of the averaged values of two or more adjacent pixels.

The averaging of the Y-values 320 of FIG. 6B show some relatively rapid spatial variation in region 324 (i.e. one of the regions that was previously saturated). With a conservative selection of scaling factors, such relatively rapid spatial variation will be difficult if not impossible to detect with the human eye. In the illustration of FIG. 6B, this spatial variation occurs in the upper portion of the luminance range (i.e. at Y-values around 50,000) and the maximum luminance variation introduced by the averaging process is around 5000 steps (i.e. a 10% variation). In a typical HDR display system, a luminance of 50,000 corresponds to about 8,000 cd/m$^2$. At that luminance level, the human eye can sense a minimum of around 10% luminance contrast in ideal conditions. In typical viewing situations at that luminance level, however, the minimum detectable luminance contrast will be much greater. As such, the scaling factors (and in particular, the maximum scaling factor $L_v$) may be selected such that it is unlikely that a user will be capable of perceiving the spatial variation effect introduced by averaging. In addition, as discussed above, the Y-values of image data scanned and scaled along different axes may be combined using a "blurry averaging" technique, which may reduce the relatively rapid spatial variation shown in FIG. 6B.

Scaling method 400 may use other additional or alternative features of the image data to determine scaling factors for the Y-values of the individual pixels in an image. One particular example of an additional or alternative feature of the image data that may used in determining the scaling factors for the individual pixels in the saturation region is behavior of the image data in the regions adjacent to the saturation region. In typical images, very sharp contrast boundaries are relatively rare and most saturated regions are likely to be surrounded by a luminance gradient wherein the Y-values surrounding the saturation region slope upwardly to the saturation region.

It may be assumed that where the gradient of the Y-values adjacent a saturation region is relatively high, the Y-values of the pixels in the saturation region should be scaled by relatively large scaling factors and where the gradient of the Y-values adjacent a saturation region is relatively low, the Y-values of the pixels in the saturation region should be scaled by relatively small scaling factors. Based on this assumption, the scaling factors for the Y-values of the individual pixels (determined in block 420) may be positively correlated to the gradient of the Y-values of pixels just outside the saturation region. More particularly, the maximum scaling factor $L_v$ may be chosen on the basis of the gradient of the Y-values of pixels just outside the saturation region.

In one example, an average gradient of the Y-values preceding a saturation region may be calculated over a number of pixels just outside the saturation region. The number of pixels over which the average may be calculated may be equal to half of the dimension of the saturation region. For such an example, the average gradient of the Y-values preceding the saturation region may be given by:

$$\nabla_{avg,pre} = \sum_{i=-v}^{0} \frac{Y(x=0) - Y(x=i)}{|i|} \quad (4)$$

where: x is an index of the pixel number and it is assumed that x=0 is the first saturated pixel; and Y(x) is the Y-value of a pixel having an index x. Similarly, the average gradient of the Y-values following the saturation region may be given by:

$$\nabla_{avg,post} = \sum_{i=2v}^{3v} \frac{Y(x=2v) - Y(x=i)}{|i|} \quad (5)$$

While equations (4) and (5) represent one technique for calculating an average gradient in the regions adjacent the saturation region, those skilled in the art will appreciate that there are other estimation techniques which may be used to obtain gradient information in these regions. Such techniques include: measuring the slope using different pairs of pixels, averaging over a larger or smaller number of pixels and weighted averaging techniques, for example.

Using these average gradient values, the maximum scaling factor $L_v$ may be selected by linear extrapolation according to:

$$L_v = 1 + \frac{1}{2} v [\nabla_{avg,pre} + \nabla_{avg,post}] \quad (6)$$

The linear extrapolation technique of equation (6) represents one method whereby the maximum scaling factor $L_v$ is chosen on the basis of the gradient in the region surrounding the saturation region. The technique of selecting the maximum scaling factor $L_v$ according to equations (4), (5) and (6) has the advantage of being sufficiently conservative, so as to minimize the risk of introducing artefacts by overestimating the scaling factor for one or more of the pixels in the saturation region.

In some circumstances, it may be useful to select the maximum scaling factor $L_v$ according to a modified version of equations (4), (5) and (6). For example, when two saturation regions on the same scan line are separated by a distance that is less than the sum of their two vertex pixels, then the non-saturated region between the two saturated regions may be split in half for the purpose of establishing the average gradient. That is, the averages expressed in equations (4) and (5) may be calculated over a smaller number of pixels equal to half the number of pixels between the saturation regions.

In another example, equation (6) may yield a maximum scaling factor $L_v$, which, when multiplied by the Y-value at the vertex (Y(x=v)), yields a result that is greater than the maximum possible Y-value for a particular HDR system. For example, the maximum possible Y-value in a 16-bit HDR system is Y=2$^{16}$−1. If the maximum scaling factor $L_v$ determined by equation (6) yields a Y-value that is higher than the maximum possible Y-value for a particular HDR system, then the maximum scaling factor $L_v$ may be set so as to yield the maximum possible Y-value for the particular HDR system. For example, in a 16-bit HDR system, the maximum scaling factor $L_v$ may be set at $L_{v,max}=(2^{16}-1)/Y(x=v)$.

In still another example, it may be advantageous to insert an additional parameter $\alpha$ into the second term of equation (6). This parameter $\alpha$ may be used to control the influence of the gradient average on the maximum scaling factor $L_v$. Those skilled in the art will appreciate that using the parameter $\alpha$, a system designer (or a suitably configured system) may control the conservativeness of the maximum scaling factor $L_v$ and the overall scaling of the other pixels.

The selection of the pixel associated with the maximum scaling factor $L_v$ (e.g. the extremum pixel v) to be at the center of the saturation region is arbitrary. In alternative embodiments, the position of the pixel associated with the maximum scaling factor $L_v$ may also be selected based on features of the image data. In one particular example, the position of the pixel associated with the maximum scaling factor $L_v$ may be selected on the basis of the gradients of the Y-values in the regions surrounding the saturation region. For example, for a particular scan line, if the gradient of the Y-values preceding the saturation region is greater than the gradient of the Y-values following the saturation region, then it may be assumed that the pixel associated with the maximum scaling factor $L_v$ should be closer to the beginning of the saturation region than to the end of the saturation region.

In some circumstances, a saturation region will occur on the edge of an image and the pixels having saturated Y-values along a particular scan line will extend all the way to the edge of the image data. In such cases, it is possible to detect the pixel at one edge of the saturation region, but it is not possible to detect the pixel at the opposing edge. One technique for dealing with this situation involves arbitrarily selecting the pixel at the edge of the image to be the pixel associated with the maximum scaling factor $L_v$. This arbitrary selection is not expected to lead to any significant artefacts if the parameter $L_v$ is chosen conservatively.

In some embodiments, other features of the image data are used as a additional or alternative basis for determining scaling factors for the Y-values of the individual pixels in a saturation region. For example, the above-described techniques contemplate determining a scaling factor on the basis of a one dimensional size of the saturation region (i.e. along a particular scan line) and/or on the basis of the gradient of the pixels on either side of the scan line. It may be advantageous to base the determination of the scaling factors on two dimensional characteristics of the image data, such as the total two-dimensional area of a saturation region (i.e. the number of pixels in the saturation region) and/or the gradient of the pixels surrounding the saturation region.

Another two-dimensional characteristic of the image data that may be used as an additional or alternative basis to determine scaling factors is the presence of lens flare features, such as sun dogs, halos or flare patterns. Lens flare features exhibit well known characteristics that may be both detected within image data and modeled. Where such lens flare features are detected, the scaling factors of the individual pixels may be determined using a model that is based, at least in part, on characteristics of the detected lens flare.

In video image data, the temporal variations in Y-values for a particular pixel may be used as an additional or alternative basis for determining the scaling factor for the particular pixel. In such a case, it may be assumed that if the previous Y-values for a pixel have been saturated for the last number of frames, then the pixel may warrant a relatively large scaling factor, whereas if the previous Y-values for a pixel have not been saturated for the last number of frames, then the pixel may be assigned a relatively small scaling factor.

Another example of image features that may be used as an additional or alternative basis to determine the scaling factors for particular pixels is the levels of the other color model values. For example, in the YIQ color model, the levels of the I and Q color model values may be used to help determine scaling factors for the Y-values. This technique has particular application in color models like the RGB color model, where some of the luminance information is contained in each of the R, G and B color model values.

Referring back to FIG. 1B, the further scaled Y-values of the image data obtained as output from block 130 may optionally be used for further HDR processing/display/printing etc. in block 140. Method 100' is easily implemented and may significantly improve the appearance of HDR images which are converted from LDR image data. In particular, method 100' may improve the appearance of HDR images which are converted from LDR image data when compared to simple linear scaling techniques.

Certain implementations of the invention comprise computer processors which execute software instructions which cause the processors to perform a method of the invention. For example, one or more processors in a dual modulation display system may implement data processing steps in the methods described herein by executing software instructions retrieved from a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links. The instructions may be present on the program product in encrypted and/or compressed formats.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

The techniques described herein involve processing image data using a number of procedures. The explanation provided above assumes that all of the image data is available and that the image data need not be processed in real time. In some circumstances, all of the image data might not be available. In addition, the image data may require real time processing. Those skilled in the art will appreciate that the above described procedures may be performed in a different order or they may be partially performed in a looping manner. For example, method 100' describes completely scanning the image data for saturation regions (block 122), scaling the image data (block 132) after it has been scanned and then displaying (or further processing) the image data (block 140). It may be useful to scan a portion of the image (e.g. one scan line), scale the portion of the image and then display the portion of the image before completing the scanning and scaling of the entire image. After scanning, scaling and displaying a portion of the image, the process may then loop back to scan, scale and display the next portion of the image. This technique may be used, for example, when all of the image data is not available or the image data must be processed in real time. As another example, scaling method 400 describes determining the scaling factors for the Y-values of a plurality of pixels in block 420 and then actually scaling the Y-values of these pixels in block 430. Those skilled in the art will appreciate that in some circumstances it may be useful to determine the scaling factor for a particular pixel and then scale the individual pixel before determining the scaling factor for the next pixel.

Some of the methods described above involve calculating scaling factors using linear equations or parabolic equations. Those skilled in the art will appreciate that other functions may be used to calculate scaling factors. Preferably, such functions have an extremum in the saturation region.

Method 100' of FIG. 1B described above involves further adjusting the Y-values of pixels in the saturation region(s) (block 130) by scaling (block 132). Those skilled in the art will appreciate that other adjustment methods may be selected to implement the block 130 adjustment of the Y-values of pixels in saturation region(s). For example, rather than determining scaling factors for the individual pixels, block 130 may involve determining desired Y-values for the pixels in the saturation region and then adjusting the Y-values of the saturated pixels to the desired Y-values by replacing the saturated Y-values with the desired Y-values. Those skilled in the art will appreciate that the desired Y-values may be related to the scaling factors described above. In one example, the desired Y-values (D(x)) are related to the above-described scaling factors L(x) according to $D(x)=S_{th}L(x)$ where $S_{th}$ is the saturation threshold. In another example, block 130 may involve determining how much to increase the Y-values for the individual pixels in the saturation region above the saturation threshold $S_{th}$ and then adding the increase to the Y-values for the individual pixels.

The methods described herein involve only a small number of processing steps per pixel and may be implemented in real time. Consequently, the methods described herein may be implemented in variety of image processing systems in a variety of different environments. Non-limiting examples of such environments include: as software included as a part of an image editor program; on the graphics card of a computer; as a part of a dedicated signal processing unit inside a video display (e.g. a television or computer monitor); as a part of a DVD player; as a part of a television tuner; as a part of scanner; and as a part of a digital camera or similar imaging device. In one particular embodiment, the methods and systems of the present invention may be used to increase the dynamic range of the standard NTSC television signal where the television unit is equipped with moderate processing power All of the methods described herein attempt to estimate scaling factors for pixels in saturation regions based on various features of the image data. These methods assume that there is no human intervention. In some applications, such as digital enhancement of photographs originally captured in a lower dynamic range representation, it may be possible for humans to select, fine tune and/or influence the scaling factors associated with particular pixels.

The scanning and scaling techniques discussed herein are all described in relation to saturation at an upper boundary of a color model value. The scanning and scaling techniques described above may also be used at the lower boundary of a color model value. For example, the scanning performed in block 120 (e.g. scanning method 200) may also involve looking for "lower boundary saturation regions" where the Y-value is below a certain lower saturation threshold. The Y-values of the pixels below this lower saturation threshold may be scaled using fractional scaling factors in block 125 in accordance with a technique similar to any of the scaling techniques described herein for the upper boundary saturation regions. Preferably, the magnitude of the offset introduced in block 115 is sufficient to move the Y-values of the image data away from a zero value by an amount which allows fractional scaling at the lower boundary saturation regions.

As mentioned briefly above, the example methods and systems discussed herein are described in relation to the Y-values (luminance) of pixels represented in the YIQ color model. Those skilled in the art will appreciate that the methods described herein may also be applied to the other color model values (i.e. I and Q) and that the methods described herein may also be applied to other color models, such as RGB, CMY, CMYK, YCbCr, YUV, HSV and HSL, for example. The methods described herein may also be applied to combinations of color model values, such as linear or non-linear combinations of color model values. In some embodiments, a combination of color model values is used to determine suitable adjustments and then the adjustments are applied to individual color model values.

One particular technique described above involves determining the maximum scaling factor $L_v$ (and possibly the location of the maximum scaling factor $L_v$) on the basis of the gradient of the Y-values for pixels just outside the saturation region. The above-described technique included a particular method (equations (4) and (5)) for determining the gradients preceding and following the saturation region. Other techniques for determining these gradients could be used. Equations which illustrate non-limiting examples of such gradient determining techniques include:

$$\nabla_{avg,pre} = \sum_{i=-v}^{0} Y(x=i+1) - Y(x=i) \quad (4A)$$

$$\nabla_{avg,post} = \sum_{i=2v}^{3v} Y(x=i) - Y(x=i+1) \quad (5A)$$

$$\nabla_{avg,pre} = \frac{\sum_{i=-v}^{0} [(Y(x=i+1) - Y(x=i)) \cdot (v-i)]}{\sum_{i=-v}^{0} (v-i)} \quad (4B)$$

-continued $$\nabla_{avg,post} = \frac{\sum_{i=2v}^{3v}[(Y(x=i)-Y(x=i+1))\cdot(3v-i)]}{\sum_{i=2v}^{3v}(3v-i)} \quad (5B)$$

In some embodiments, method 100 or method 100' may comprise another further adjustment procedure after block 130 but prior to block 140. Such further adjustment may comprise further scaling and may be used to make use of any left-over dynamic range in the higher bit depth representation.

In some embodiments, the methods comprise initially adjusting the color model values of pixels in the image data to form an intermediate higher bit depth representation of the image data. Adjusting the color model values of the individual pixels in the saturation region may be performed on pixels of the intermediate higher bit depth representation. Identifying pixels which are in the saturation region may also be performed on pixels of the intermediate higher bit depth representation.

Accordingly, the scope of the invention is to be construed in accordance with the substance defined by the following claims.

What is claimed is:

1. A signal processing unit configured to convert image data from a lower bit depth representation to a higher bit depth representation, the signal processing unit comprising:
   a processor configured to:
   identify pixels in a saturation region wherein a color model value of each individual pixel in the saturation region is one of: above an upper saturation threshold and below a lower saturation threshold; and
   adjust the color model value of one or more of the individual pixels in the saturation region by a corresponding adjustment, a magnitude of each adjustment dependent, at least in part, on a number of pixels between the corresponding individual pixel and an edge of the saturation region.

2. A signal processing unit according to claim 1 wherein the processor is configured to identify pixels in the saturation region by scanning the color model values of pixels in the image data along a first scan axis to determine a start pixel at one edge of a saturation region and an end pixel at another edge of the saturation region.

3. A signal processing unit according to claim 1 wherein the processor is configured to determine the magnitude of each adjustment based, at least in part, on a function of the number of pixels between the corresponding individual pixel and the edge of the saturation region, wherein the function has an extremum in the saturation region.

4. A signal processing unit according to claim 3 wherein the processor is configured to identify pixels in the saturation region by scanning the color model values of pixels in the image data along a first scan axis to determine a start pixel at one edge of a saturation region and an end pixel at another edge of the saturation region.

5. A signal processing unit according to claim 4 wherein the function comprises a parabola and the processor is configured to set a vertex of the parabola to be substantially midway between the start pixel and the end pixel.

6. A signal processing unit according to claim 5 wherein the magnitude of the function at the extremum increases with a number of pixels between the start pixel and the end pixel.

7. A signal processing unit according to claim 2 wherein the processor is configured to determine the magnitude of each adjustment on the basis of at least one of: a gradient between the color model values of the start pixel and at least one pixel preceding the start pixel and a gradient between the color model values of the end pixel and at least one pixel following the end pixel.

8. A signal processing unit according to claim 1 wherein the processor is configured to determine a number of pixels in the saturation region and to determine the magnitude of an adjustment based, at least in part, on the number of pixels in the saturation region.

9. A signal processing unit according to claim 1 wherein the processor is configured to determine the magnitude of an adjustment based, at least in part, on detecting a lens flare pattern surrounding the saturation region; and predict color model values of pixels in the saturation region based at least in part upon a model of the lens flare pattern.

10. A signal processing unit according to claim 1 wherein the processor is configured to adjust the color model values of the pixels in the image data to form an intermediate higher-bit-depth representation of the image data and wherein adjusting the color model value of individual pixels in the saturation region is performed on pixels of the intermediate higher bit depth representation.

11. A signal processing unit according to claim 1 wherein the processor is configured to scale the color model values of individual pixels in the saturation region by corresponding scaling factors.

12. A signal processing unit according to claim 1 wherein the image data comprises data derived from an NTSC color television signal.

13. A television comprising a signal processing unit according to claim 1.

14. A signal processing unit according to claim 1 wherein the processor is configured to determine the magnitude of each adjustment based, at least in part, on a gradient between the color model values of at least one pixel on the edge of the saturation region and at least one pixel outside of the saturation region.

* * * * *

UNITED STATES PATENT AND TRADEMARK OFFICE
CERTIFICATE OF CORRECTION

PATENT NO. : 8,249,337 B2  Page 1 of 1
APPLICATION NO. : 11/831521
DATED : August 21, 2012
INVENTOR(S) : Lorne A. Whitehead It is certified that error appears in the above-identified patent and that said Letters Patent is hereby corrected as shown below:

In the Specifications:

Column 9, line 46, the word "legions" should be changed to --regions--.

Signed and Sealed this
Twentieth Day of November, 2012

David J. Kappos
*Director of the United States Patent and Trademark Office*